United States Patent [19]

Katsumori

[11] 4,189,033
[45] Feb. 19, 1980

[54] SHOCK ABSORBER

[75] Inventor: Teiji Katsumori, Yokohama, Japan

[73] Assignee: Tokico Ltd., Kanagawa, Japan

[21] Appl. No.: 889,447

[22] Filed: Mar. 23, 1978

[30] Foreign Application Priority Data

Apr. 1, 1977 [JP] Japan ............................. 52-40376[U]

[51] Int. Cl.² .................... F16F 9/06; F16F 9/36
[52] U.S. Cl. ........................... 188/269; 92/86;
137/853; 277/29; 188/315; 188/322
[58] Field of Search ............. 188/269, 315, 322;
267/64 R, 64 A, 64 B, 65 R; 137/853; 277/29;
92/86

[56] References Cited

U.S. PATENT DOCUMENTS

| | | | |
|---|---|---|---|
| 2,020,122 | 11/1935 | Padgett | 188/322 X |
| 3,203,511 | 8/1965 | Long, Jr. | 188/315 |
| 3,513,947 | 5/1970 | Duckett | 188/269 |
| 3,720,405 | 3/1973 | Lohr | 267/64 R |
| 4,005,769 | 2/1977 | Itoh | 188/315 |
| 4,108,287 | 8/1978 | Kato | 188/315 |
| 4,114,866 | 9/1978 | Kato | 188/322 X |

FOREIGN PATENT DOCUMENTS

| | | | |
|---|---|---|---|
| 96089 | 5/1960 | Norway | 137/853 |
| 1227949 | 4/1971 | United Kingdom | 267/64 R |

*Primary Examiner*—George E. A. Halvosa
*Attorney, Agent, or Firm*—Wenderoth, Lind & Ponack

[57] ABSTRACT

A dual tube hydraulic shock absorber includes an inner tube or a cylinder slidably receiving a piston therein, a piston rod secured to the piston and extending out of the cylinder through the upper end thereof, an outer tube surrounding the cylinder to define around the outer periphery of the cylinder an annular reservoir chamber, working liquid filled in the cylinder and in the lower portion of the reservoir chamber, pressurized gas filled in the upper portion of the reservoir chamber, a seal member engaging with the piston rod to seal the shock absorber from the outside, a path connecting the lower portion of the reservoir chamber with the interior of the cylinder, a passage connecting the upper portion of the reservoir chamber with the interior of the cylinder, and check valve means disposed in the passage. The check valve means is formed separately from the seal member and comprises an annular resilient valve member secured to a retaining member formed of a metal.

6 Claims, 2 Drawing Figures

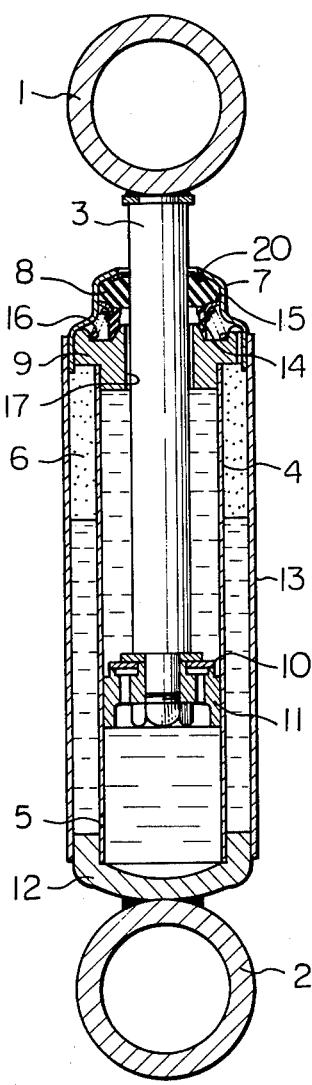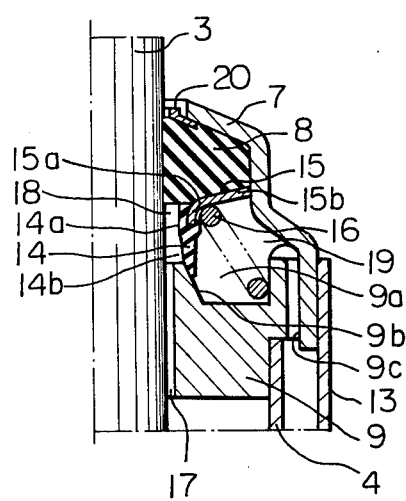

SHOCK ABSORBER

BACKGROUND OF THE INVENTION

This invention relates to a shock absorber for use in such as a vehicle suspension system or the like and, more particularly, to a hydraulic shock absorber of the type comprising a dual cylindrical tube consisting of an inner tube defining a cylinder and an outer tube surrounding the inner tube and defining an annular reservoir chamber around the outer periphery of the inner tube, a piston slidably disposed in the inner cylinder and having a piston rod extending out of the dual tube, liquid being filled in the cylinder and in a portion of the reservoir chamber, and pressurized gas being filled in a portion of the reservoir chamber.

In operating shock absorbers of the aforementioned type, air will sometimes enter into the cylinder according to the so-called aeration phenomenon, wherein gas in the reservoir chamber is mixed with liquid and introduced into the cylinder and thereafter separates from the liquid during vigorous operating conditions, or according to pressure difference generated between the gas in the reservoir chamber and liquid in the cylinder on the upper side of the piston during downward movement of the piston. Since the operating characteristics of the shock absorber will be substantially impaired when gas enters into the cylinder, it is necessary to return the gas into the reservoir chamber.

Various devices have been proposed to return the gas entered in the cylinder to the reservoir chamber, for example, Japanese Utility Model Publication 48-25495 shows a lip portion formed integrally with a seal member which sealingly closes an opening of the dual tube through which the piston rod extends. The lip portion acts as a check valve allowing fluid flow from the interior of the cylinder to the reservoir chamber but preventing fluid flow from the reservoir chamber to the interior of the cylinder. The lip portion is formed to depend downward from a main body portion of the seal member, and thus, in manufacturing the seal member, it is difficult to reduce the thickness of the lip portion to a desired thickness, and therefore the sensitivity of the check valve is impaired. Further, since the lip portion and the seal member are formed integrally of one material, there are the shortcomings that when a material having some degree of rigidity is used to conform the requirements of the check valve the sealing characteristics against the piston rod will be impaired, when a soft material is used to ensure desired sealing characteristics the function of the check valve will be impaired. Further, the sliding movement of the piston rod relative to the seal member tends to carry the seal member itself in the same direction, and thus the function of the check valve will further be impaired.

SUMMARY OF THE INVENTION

An object of the present invention is to overcome such shortcomings in the prior art shock absorbers, and according to the invention, there is provided in a shock absorber of the type aforementioned a check valve disposed between a chamber above of the piston in the cylinder and the reservoir chamber for allowing fluid flow only form the chamber in the cylinder to the reservoir chamber. The check valve comprises a valve seat formed on a rod guide which guides the piston rod, a valve member disposed on the upper side of the rod guide and having a valve portion for engaging with the valve seat, and a retaining ring secured integrally to the valve member.

Preferably, the retaining ring is integrally secured to the valve member by baking or the like and acts to locate the valve member at a predetermined position with respect to the valve seat.

BRIEF DESCRIPTION OF THE DRAWINGS

This and other objects and advantages of the present invention will become apparent from the following description taken in conjunction with the accompanying drawings, in which:

FIG. 1 is a longitudinal cross-sectional view of a hydraulic shock absorber according to the present invention; and FIG. 2 is an enlarged view showing the essential portion of FIG. 1.

DETAILED DESCRIPTION OF THE PREFERRED EMBODIMENT

FIG. 1 is a cross-sectional view of a shock absorber of the present invention and, reference numerals 1 and 2 are mounting rings respectively for mounting the shock absorber on sprung and unsprung masses of a vehicle. A piston rod 3 is secured to the mounting ring 1, and mounted on the other end of the piston rod 3 is a piston 11 having a disc valve 10 known per se which generates damping force both in the extending and contracting strokes of the shock absorber. The piston 11 slidingly moves in a cylinder 4 filled with oil. The upper end of the cylinder 4 is closed by a rod guide 9 guiding the piston rod 3. The lower end of the cylinder 4 is fitted into and supported by a bottom cap 12 which is secured to the mounting ring 2. An opening is formed in the lower end portion of the cylinder 4 to constitute a communicating path 5. The communicating path 5 communicates the interior of the cylinder 4 with a reservoir chamber 6 or an annular chamber defined in the interior of an outer tube 13, the lower end of which is sealingly supported by the outer wall surface of the bottom cap 12. The upper end of the outer tube 13 sealingly supports a flange portion of an end cap 7 which supports the rod guide 9. A seal member 8 is disposed between the end cap 7 and the rod guide 9. The seal member 8 sealingly closes the interior of the shock absorber, with the inner periphery of seal member 8 engaging with the piston rod 3 and the outer periphery of seal member 8 engaging with the end cap 7. The rod guide 9 is disposed at a position spaced from the seal member 8 by a predetermined distance and has an annular recess 9a and a valve seat portion 9b of the shape of a truncated cone projecting upwardly in the central portion.

Shown at 14 is an annular valve member formed of a resilient material (rubber or the like, for example) and having a thick wall portion 14a and a valve portion 14b of a reduced thickness. The thick wall portion 14a of the valve member 14 is integrally secured to the inner peripheral portion of a cylindrical flange portion 15a of a retaining member 15 by such as baking or the like so that the reduced thickness portion 14b depends downwardly and acts as a valve portion to engage tightly on the valve seat 9b of the rod guide 9 from the radially outer side thereof according to the interference fit therebetween. Preferably, the retaining member 15 is formed of a sheet metal. The valve seat 9b and the valve member 14 constitute check valve means according to the present invention.

The valve member 14 acts as a check valve such that when a force in the radially outward direction acts on the valve portion 14b of the valve member 14, the free end of the valve portion 14b deflects in the radially outward direction and separates from the valve seat 9b, and when the force is released the resiliency of valve portion 14b causes the valve portion 14b to abut with the valve seat 9b. The valve member 14 is supported to abut with the lower surface of the seal member 8 by a spring 16 acting between the annular recess 9a and the lower surface of the retaining member 15. The retaining member 15 is located with respect to the seal member 8 and the cap 7, with the outer periphery of an inclined or a conical main body portion 15b of the retaining member 15 being fitted in the inside of the end cap 7, whereby the valve member 14 is located coaxially with respect to the valve seat 9b. In the illustrated embodiment, the valve member 14 abuts with the lower end of the seal member 8, but the location of the valve member 14 is not restricted to the position shown in the drawing, and the valve member may be located at a position spaced from the seal member 8. In the drawing, the thick wall portion 14a of the valve member 14 is secured to the flange portion 15a of the retaining member 15, but it is possible to adopt any suitable constitution, e.g. such that the thick wall portion 14a extends further to the main body portion 15b if the retaining member 15 would be secured integrally to the valve member 14 with an object of increasing the rigidity of the valve member 14 acting as a check valve or a one-way valve.

Further, a central bore having a diameter slightly larger than that of the piston rod 3 is formed in the rod guide 9 for slidably receiving the piston rod 3 therein. A clearance passage 17 is formed between the bore and the piston rod 3. The clearance passage 17 connects the interior of the cylinder 4 with a space 18 defined between the seal member 8 and the rod guide 9. One or more grooves are formed in the outer peripheral portion of the rod guide 9 to act as a passage 9c between the rod guide 9 and the depending portion of the end cap 7. The passage 9c connects the reservoir chamber 6 and a space 19 which is defined by the seal member 8, the rod guide 9 and the end cap 7.

The space 18 and the space 19 are partitioned by the valve member 14 which contacts normally contacts with the valve seat 9b of the rod guide 9. Valve member 14 can expand only radially outwardly and acts as a check valve allowing fluid flow only from the space 18 to the space 19.

A washer 20 clamped between the seal member 8 and the cap 7 is utilized in filling pressurized gas into the shock absorber.

As known to those skilled in the art, oil is filled in the interior of the cylinder 4 and in the lower portion of the reservoir chamber 6, and pressurized gas is filled in the upper portion of the reservoir chamber 6.

In the shock absorber, when the piston rod 3 is pushed into the cylinder 4 oil ingresses into the reservoir chamber 6 through the communicating path 5. Pressure of the pressurized gas in the upper portion of the reservoir chamber 6 will increase in response to the volume of oil ingressed into the chamber 6, and although the reservoir chamber is communicated permanently with the space 19, the compressed air in the space 19 is intercepted from ingressing into the cylinder 4 since the valve portion 14b of the valve member 14 seats on the valve seat 9b to prevent gas flow into the space 18, the clearance passage 17 and cylinder 4 from the space 19.

When the piston rod 3 moves upward with the piston 11, oil in the cylinder 4 above the piston 11 is pressurized. A part of the oil above the piston 11 ingresses into the space 18 through the clearance passage 17. When the piston rod moves further in the extending direction and the space 18 is filled with oil, the oil in the space 18 opens the valve member 14 and returns into the reservoir 6 through the space 19 and the passage 9c. At the same time, a part of the oil above the piston 11 deflects the inner peripheral portion of the disc valve 10 downwardly to form a passage and flows into the lower side of the piston 4, and a damping force is generated.

As described heretofore in detail, the shock absorber according to the present invention comprises a retaining member integrally secured to the valve member of a check valve means. Thus, it is possible to increase the rigidity of the valve portion of the check valve means and the function of the check valve means will be satisfactorily fulfilled even if the pressure in the reservoir chamber would be increased extraordinarily. Further, since the outer periphery of the retaining member is fitted into and supported by the inner surface of the end cap, the valve member can be located positively and uniformly on the valve seat. Further, since the seal member and the valve member are formed separately, respective members can be formed of respective materials having most suitable characteristics, and the function of the check valve means will not be impaired. Further, since the seal member and the valve member are separate members, movement of the seal member in response to the movement of the piston rod will not be transmitted directly to the valve member. Thus, the function of the check valve means will not be impaired.

What is claimed is:

1. A dual tube type hydraulic shock absorber comprising:
   an inner tube defining a cylinder chamber;
   an outer tube surrounding said inner tube and defining therebetween an annular reservoir chamber;
   a piston slidably disposed in said cylinder chamber;
   a rod guide secured to and closing an upper end of said inner tube;
   a piston rod secured to said piston and extending outwardly of said cylinder chamber through said rod guide;
   working liquid filling said cylinder chamber and a lower portion of said reservoir chamber;
   pressurized gas filling an upper portion of said reservoir chamber;
   seal member means positioned above said rod guide for sealing the interior of said shock absorber from the exterior;
   an annular space defined between said rod guide and said seal member means, said annular space being in communication with said reservoir chamber;
   an annular retaining member positioned below said seal member means;
   spring means for urging said retaining member against a lower surface of said seal member means;
   said rod guide having an upper surface forming an annular valve seat;
   an annular valve member separate from said seal member means and secured to the inner periphery of said retaining member; and
   said annular valve member including a resilient annular valve portion, said valve portion being engageable with said valve seat to form means for preventing fluid flow therebetween in a radial inward direction, and said valve portion being separable from said valve seat to allow fluid flow therebetween in a radial outward direction.

2. A shock absorber as claimed in claim 1, wherein said retaining member comprises an annular metal plate.

3. A shock absorber as claimed in claim 2, wherein said annular valve member is rigidly secured to said retaining member by baking or the like.

4. A shock absorber as claimed in claim 1, further comprising an end cap secured to an upper end of said outer tube, and wherein the outer periphery of said annular retaining member cooperates with said end cap to position said valve portion coaxially with respect to said valve seat.

5. A shock absorber as claimed in claim 1, wherein said rod guide has in the upper portion thereof an annular recess, and said valve seat comprises a radially inner wall surface of said recess.

6. A shock absorber as claimed in claim 5, wherein said valve portion depends downwardly from said retaining member into said recess.

* * * * *